Dec. 9, 1969    K. L. KONNERTH, JR    3,483,383
OPTICAL PULSE COMMUNICATION AND RANGING SYSTEM BY
AMPLITUDE MODULATING LASER INJECTION SOURCE
AND DETECTING OPTICAL PULSE WIDTH
Filed March 11, 1964    2 Sheets-Sheet 1

INVENTOR.
KARL L. KONNERTH, JR.
BY
Thomas J. Kilgannon Jr.
ATTORNEY

United States Patent Office 3,483,383
Patented Dec. 9, 1969

3,483,383
OPTICAL PULSE COMMUNICATION AND RANGING SYSTEM BY AMPLITUDE MODULATING LASER INJECTION SOURCE AND DETECTING OPTICAL PULSE WIDTH
Karl L. Konnerth, Jr., Putnam Valley, N.Y., assignor to International Business Machines Corporation, New York, N.Y., a corporation of New York
Filed Mar. 11, 1964, Ser. No. 351,157
Int. Cl. H04b 9/00
U.S. Cl. 250—199                          16 Claims The invention relates to pulses communication and ranging systems generally, and in particular, to a pulse duration communication and ranging system which utilizes a laser to produce extremely short pulses of variable duration.

While lasers have been highly touted for application to communication systems because of the enormous band width available, up until this time, no major use has been made of lasers in this area because of the limitations terrestrial environments impose on such devices. Even though limitations placed on laser communication by fog, atmosphere, earth curvature and the like are significant, ways have been suggested utilizing light guides and optical systems to overcome the problems due to environment alone. Other problems in the technical area, however, are present which also limit the use of lasers in communication and ranging systems. Great difficulty has been experienced in applying modulation to lasers and in removing this modulation at a receiver. In modulation schemes such as amplitude modulation, spurious noise reduces the utility of this method of modulation. Detector response, devices capable of modulating at high rates, signal-to-noise ratios and other factors which harassed the early experimenters in both the radio and microwave ranges are now problems in this higher and potentially most useful frequency range.

Even though the laser as an earth-bound device has many problems in such an environment, it is uniquely a child of age which spawned it in that its greatest potential and application appear to be in the space environment. Space, though a region of vast distances, presents low attenuation to radiant energy at light frequencies. The extremely wide band width available in this frequency range makes multi-channel communication possible in a region where the vast distances between communicators makes the parallel flow of information more desirable than sequential flow. Also, because of the narrow beam width outputs obtainable, secrecy, highly necessary to military and intelligence operations, can be maintained with ease.

However, even in the space environment where light years and parsecs are measures of distance, success or failure of a space mission can depend on a fraction of a pound of thrust, a few feet differential in an orbit from a desired orbit, a miscalculation of a degree in a re-entry angle. Such factors leave little room for error and, for the most part, have been met and solved by man and state-of-the-art technology. However, a new era of manned exploration of space and nearby celestial bodies has given rise to new techniques and criteria which are even more demanding insofar as precision and accuracy are concerned. One such technique expected to be used in the Gemini program is the so-called "docking" or "rendezvous" operation in which an orbiting manned space craft is joined with a previously orbited canister which may contain fuel or other equipment necessary for long duration space flights. It is, of course, an object of such operation to accomplish docking with accuracy and with sufficiently low closure rates to permit necessary alignment corrections and to eliminate possible shock damage. At present, pulsed amplitude modulated radar systems, which might be used for docking, are limited to use within approximately five feet during the operation because of receiver blocking and inadequate Doppler resolution. Frequency modulated radars, while less limited in range, present problems in size and weight which are undesirable in space. Thus, microwave frequencies are too low to give adequate resolution at the low velocities involved in docking, even if receiver blocking were not a factor. However, at optical frequencies adequate resolution is theoretically obtainable indicating a laser which operates at these frequencies could be used. Lasers, however, have not been utilized because no way of producing pulses of sufficiently narrow width is presently known.

Even though the change from a translucent terrestrial environment to the optically perfect stellar reaches has eliminated some of the major problems associated with lasers, outstanding problems relating to laser modulation, problems relating to laser modulation, spurious noises, narrow pulse generation and detection methods remain. It appears, therefore, that a need exists for a simplified modulation method and apparatus in which spurious noise presents no problem, in which state-of-the-art detection techniques can be utilized and in which pulses of extremely narrow width can be generated.

It is, therefore an object of this invention to provide an improved communication and ranging system which operates at light frequencies.

Another object is to provide a pulse communication and ranging system utilizing a laser which is not subject to spurious noise problems.

Another object is to provide a pulse communication and ranging system which can be simply and easily modulated.

Still another object is to provide a pulse communication and ranging system which utilizes pulse duration modulation.

Yet another object is to provide a pulse communication system which generates pulses having widths in the sub-nanosecond range.

A further object is to provide a pulse communication system which is capable of providing a greater number of multiplex channels than in presently available systems.

Another object is to provide a ranging system which can be utilized for long-range operation and for determining ranges which are less than one inch.

Another object is to provide a ranging system which is capable of discriminating between closely spaced targets and which has a variable peak power.

Another object is to provide an optical frequency ranging system which is not subject to receiver blocking and which has a Doppler resolution adequate for docking space craft.

A feature of this invention is the utilization of means for generating a pulse train the pulses thereof having a given duration and amplitude in conjunction with a semiconductor device which is adapted to emit coherent radiation responsive to the instantaneous amplitude of the pulses of the pulse train such that light pulses of duration less than said given duration are emitted.

Another feature of this invention is the utilization of a pulse generator to supply pulses of given duration and amplitude in conjunction with a semiconductor device which is adapted to emit pulses of coherent light having a duration less than the given duration in response to the instantaneous amplitude of the applied pulses. Also included is a means for varying the amplitude of the pulses of the pulse train such that light pulses of variable duration less than the given duration are emitted.

A further feature of this invention includes the utilization of temperature control means associated with the semiconductor device to control its temperature such that delays directly proportional to a change in temperature are generated.

Still another feature is the utilization of detection means, locally or remotely disposed, whereby reflected pulses or directly transmitted pulses are received prior to further processing.

A further feature includes the utilization of devices coupled to the detector such as display devices, computers, audio transducers and the like.

A still further feature of this invention is the utilization of a ranging and communication method including the steps of generating a pulse train of given duration and amplitude and applying the pulse train to a semiconductor device which is adapted to emit coherent light to produce a train of light pulses having a duration less than said given duration. Also included is the step of modulating the amplitude of the pulse train to produce output light pulses having durations less than said given durations and directly proportional to the amplitude of the modulating pulses.

The foregoing and other objects, features, and advantages of the invention will be apparent from the following more particular description of a preferred embodiment of the invention as illustrated in the accompanying drawings.

plotted from experimentally obtained values showing that the value of $\tau$ obtained is in substantially agreement with theoretically determined values of $\tau$.

The present invention is based on the discovery that the pulse width of very narrow pulses of light may be varied by varying the amplitude of the driving current of a gallium arsenide laser. It has been discovered that when current pulses having a maximum duration of 2 nanoseconds, for instance, are applied to a gallium arsenide laser which is at a temperature of 77° K., that the resulting light pulse output has a duration which is less than the duration of the input pulse and that the resulting pulse width is directly proportional to the amplitude of the driving current. Output light pulse widths in the sub-nanosecond range have been obtained by simply reducing the drive current while maintaining the duration of the driving pulse constant. There are clear indications, which will be explained in detail in what follows, that the pulse widths obtained are extremely narrow in spite of the fact that, in the pulse width range used, one is ordinarily content with reproducing a pulse at an output which is slightly greater in width than the width of an input pulse. In the pulse duration ranges utilized in the invention, smearing of an input pulse is normally expected because of the response of the various electronic components usually involved.

A theoretical basis for the operation of lasers in this manner has been postulated and will be explained fully hereinafter along with experimental evidence which appears to support the theoretical considerations.

Figure 2:
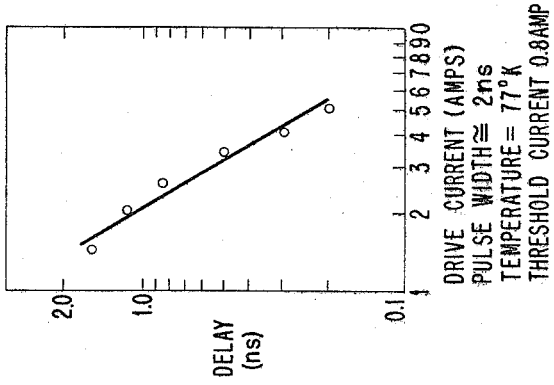
FIG. 2 is a logarithmic plot of the relationship between the amplitude of a laser driving current pulse and the delay introduced on an output light pulse.
Figure 1:
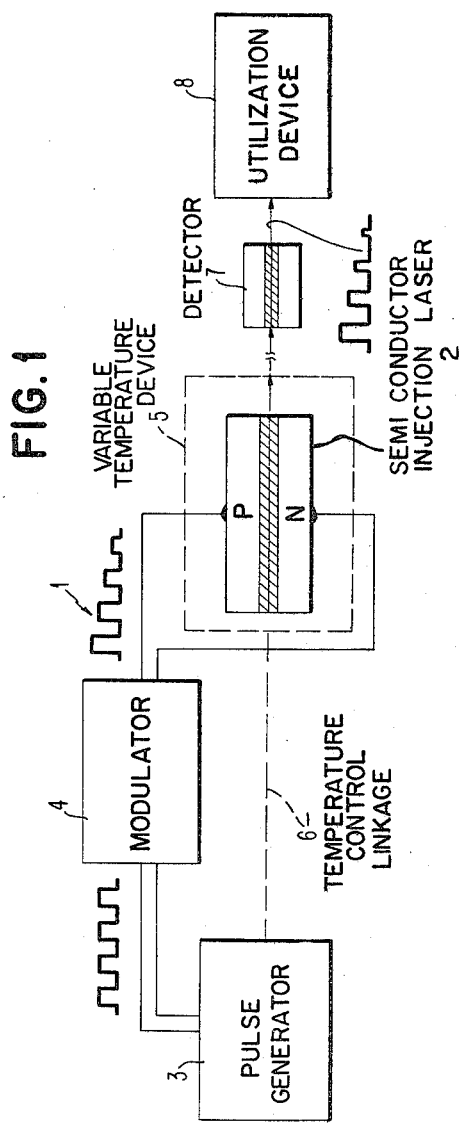
FIG. 1 is a block diagram of a pulse communication and ranging system in accordance with this invention.

Referring now to FIG. 1, a pulse communication and ranging system is shown generally at 1. A semiconductor device 2, preferably a gallium arsenide diode which provides light amplification by stimulated emission of radiation (laser), is shown coupled to a source of pulses 3 which provides a pulse train output having a given pulse duration and amplitude. A modulator 4 adapted to vary the amplitude of the pulses is shown coupled to semiconductor device 2 and to source 3. Modulator 4 may be a mechanical or electronic device which varies the amplitude of the pulses from source 3. A variable resistor or a voice-modulation means such as a microphone or telephone are appropriate modulators. Because of the relationship between the amplitude of the pulses applied to the lasers and the width of the output light pulses as shown in FIG. 2, it is possible to obtain modulations at frequencies up to at least several kilo-megacycles. FIG. 2 shows a logarithmic plot of the laser light output delay as it relates to the amplitude of the laser drive current. FIG. 2 shows that the delay obtained is inversely proportional to the amplitude of the driving current; that is, the greater the current amplitude, the smaller the delay obtained and the wider the output pulse. From this, it may be seen that by simply varying the drive current, it is possible to vary the width of an approximately 2-nanosecond input pulse, for instance, from that width to a 0.2-nanosecond pulse width. The measurements plotted in FIG. 2 were made at 77° K.; and, as will be seen later, the delays obtainable increase with increasing temperature.

Returning to FIG. 1, a block 5 representing a variable temperature device is shown contiguous with semiconductor device 2. Variable temperature device 5 may be any device which can be cooled to temperatures near absolute zero. The temperature can be varied by controlling the flow of coolant to a cooling chamber. In addition device 5 should be capable of maintaining fixed temperatures from near absolute zero to room temperature and above. As will be seen from what follows, greater delays are obtainable as the temperature of semiconductor device 2 is increased. The amplitude of the driving pulses, however, must be increased to permit the onset of lasing. Since the amplitude of the pulses from pulse generator 3 must be increased with increasing temperature, a linkage 6, which may be electrical or mechanical, may be utilized to simultaneously vary the pulse generator amplitude as the temperature of device 5 is changed.

In FIG. 1, there is shown a detector 7, the response time of which is fast enough to detect light pulses having sub-nanosecond widthsw. Detector 7 may be adapted to simultaneously demodulate so that the modulation after proper amplification may be applied to a utilization device 8. Utilization device 8 may be a loud speaker where a voice output is desired or may be a display device or a computer responsive to digital information. Thus, a binary system utilizing a single variation in pulse width or a system having different levels may be utilized by appropriately modulating semiconductor device 2. Utilization device 8 may, in fact, be any device which requires a pulse input in the sub-nanosecond range. The capability of generating sub-nanosecond pulses of known width alone represents a significant step when it is realized that many experimental procedures have been halted in the past for lack of such a pulse generating capability.

Figure 3:
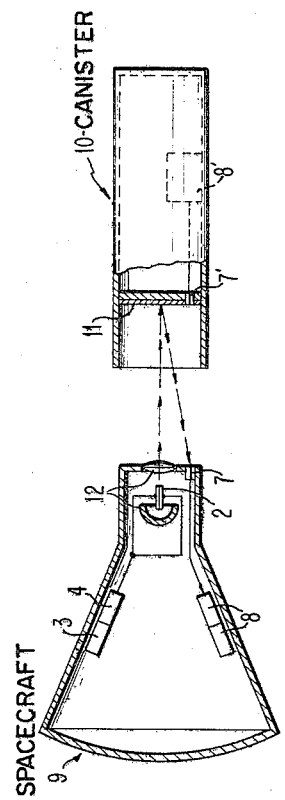
FIG. 3 is a representation of a space craft and a pre-orbited canister in a "docking" or "rendezvous" orientation utilizing the communication and ranging system of this invention.

In FIG. 3 there is shown a representation of a space craft 9 making a "rendezvous" or "docking" with a pre-orbited canister 10 utilizing a ranging system to be described hereinbelow. The system of FIG. 1 would be aboard space craft 9 including the detector 7 and utilization device 8. In this instance, utilization device 8 would include a display device to indicate the relative positions of a space craft 9 and canister 10 and a computer to determine rate of closure based on Doppler information obtained from reflected light pulses. Canister 10 has an appropriately located light reflecting surface 11 from which reflected light pulses are returned to detector 7.

The particular advantage of the system of FIG. 3 is that extremely short light pulses can be produced thereby providing range information which can be measured in inches.

It should be appreciated, at this point, that the extremely narrow pulse widths provide good Doppler resolution, a factor which is required for the computation of closure rates. This is apparent from the relationship for Doppler shift $$F_D = \frac{2Vf}{c}$$

where

V is relative radial velocity in meters/sec.
$f$ is the frequency of the transmitted light pulse in cycles/sec.
$c$ is the velocity of light in meters/sec.

Thus, where V is extremely small, $f$ must be very high to produce a measurable Doppler shift. Clearly, then, both for determining range and rate of closure, the system of the present invention fulfills the criteria of very narrow pulse widths for extremely small ranges and extremely high frequency for adequate Doppler resolution. It should also be noted, that by simply placing a detector 7' aboard canister 10, that voice or computer information may be transmitted from the space craft providing a communications link with utilization device 8' when the equipment is not being utilized in a ranging mode.

In connection with the utilization of a gallium arsenide laser device 2 in a ranging mode, a collimation system 12 consisting of a lens or a parabolic reflector or a combination of both may be utilized to provide narrow, highly concentrated light beams.

Because of the extremely narrow pulse width available, it is possible, utilizing the system of FIG. 1, to multiplex a greater number of channels than has been possible heretofore. Using sampling rates which are required for intelligibility of voice communication, a greater number of channels can be sampled because of the narrow pulses being used before the next succeeding sample of a given channel must be obtained. A plurality of systems 1, in FIG. 1, each separately modulated may be controlled by conventional multiplexing techniques well-known to those skilled in the multiplexing art.

Figure 4:
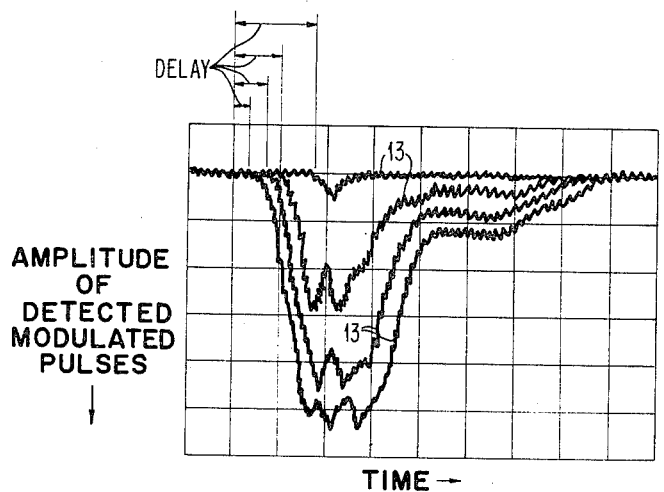
FIG. 4 shows a number of detected laser light pulses each of which is simultaneously duration and amplitude modulated.

FIG. 4 shows a number of pulses 13, each having a pulse duration less than a preceding pulse. It should be noted that the greater the pulse duration, the greater is that pulse's amplitude. The amplitude of the output pulse is proportional to the amplitude of the driving pulse. Thus, any output pulse is simultaneously amplitude modulated and width modulated. The amplitude modulation consists essentially of noise and would appear as such in any receiver. Fortunately, the amplitude modulation may be clipped from a received pulse by means of conventional techniques and a substantially noise-free, duration-modulated pulse is available for further processing at a receiver. One advantage accrues to a user as a result of the amplitude modulation of the duration modulated pulses. In the ranging mode, pulses of higher peak power can be transmitted to acquire target which can then be irradiated with narrow pulse, lower peak power pulses to resolve specific targets within the first acquired target area.

In FIG. 1, semiconductor device 2, is preferably a gallium arsenide diode (laser) which is manufactured, for instance, by diffusing zinc into n-type gallium arsenide to form a junction. Optically flat semi-reflecting surfaces are then obtained by mechanically cleaving the device in a plane perpendicular to the plane of the junction. Other materials such as gallium arsenide phosphide, indium antimonide, and indium arsenide which have been appropriately doped may be utilized to provide a semiconductor device which provides an output pulse which is less than the duration of the input pulse.

In one experimental arrangement similar to that shown in FIG. 1, a Fabry-Perot GaAs laser 2 with a threshold current of about 800 ma was cooled by attaching it to a liquid nitrogen cooled copper block 5 in an evacuated chamber. A conventional pulse generator 3, a Tektronix Type 110 Pulse Generator and Trigger Takeoff, for example, was used to produce the driving pulse for the laser through a 49 ohm series resistor. The output of the laser 2, was applied to a detector 7, a Philco L-4501 silicon p-n junction detector, for example. The output of the detector was measured on a Tektronix 661 Sampling Oscilloscope 8 with a Type 452 Amplifier which has an effective rise time of 0.1 nanosecond. As is shown in FIG. 2, the delay obtained was inversely proportional to the amplitude of the applied pulses at temperatures close to the temperatures of liquid nitrogen. The delays were measured by comparing the total time of the input and output pulses and their relative timing. Further tests indicated that increasing delays could be obtained by increasing the temperature of the device from 77° K. through a temperature range to room temperature (60° F.) and above. Under such conditions, delays of up to 500 nanoseconds have been obtained utilizing a driving pulse having a pulse width only slightly larger than the total delay. High driving currents in the tens of amperes range are required, however, to provide delays of the order of magnitude of several hundred nanoseconds. This was expected, however, in view of the well-known fact that the threshold current increases with increasing temperature.

It is believed that the laser device exhibits the delays discovered because it takes a finite time to invert the carrier population to a point where sufficient carriers are present to cause lasing to occur. The time required to cause carrier population inversion is inversely proportional to the amplitude of the applied pulse. When a delay is exhibited prior to the onset of lasing, tests have shown that when the driving pulse is turned off that the light pulse follows the input pulse decrease in amplitude and is not subject to a delay in the same way as the increasing edge of the input pulse.

A simple test indicates that if sufficient carriers are present lasing will take place and that carrier population inversion time is inversely proportional to the amplitude of the current applied to the laser. Two driving pulses 0.5 nanosecond apart were applied to a gallium arsenide laser. The first pulse from the laser exhibited a predicted delay, but the second pulse exhibited hardly any delay at all. However, by changing the pulse spacing, it was possible to obtain the same delay in each output pulse. In the first instance, where no delay was exhibited by the second pulse, it is believed that sufficient carriers remained after the application of the first pulse to cause the onset of lasing practically immediately upon application of the second pulse. In the second instance, where the pulse spacing was changed, it is believed that the carrier population had time to decay to a lower level and that the same delay was exhibited by the second pulse because the conditions "seen" by the second driving pulse were exactly the same as "seen" by the first pulse. The fact that time is required before the laser carrier population returns to a stable level so that the same conditions are presented to an incoming pulse limits the repetition rates which can be utilized when a single laser is being used; but, as a practical matter, the limitation does not appear to be significant. The phenomenon can, in fact, be turned to advantage in situations where coding to indicate the start of a message, for instance, is used. In situations where a particular receiver from a plurality of receivers is to be utilized, a code based on the particular widths of two succeeding pulses can be used to gate a receiver on.

Experimental results obtained agree fairly well with theoretical calculations made based on the parameters involved. Assuming a simple model with only one important spontaneous lifetime $\tau$, for the time prior to the onset of stimulated emission, the rate of change of carrier density with respect to time can be written $$\frac{dn}{dt} = aI - \frac{n}{\tau}$$

where:

$n$ = carrier density in electrons/cubic centimeter
$a$ = constant which includes laser dimensions, charge on an electron, etc.
$I$ = driving current in amperes
$\tau$ = spontaneous emission lifetime in nanoseconds.

If the current is abruptly increased from zero to $I$ at $t=0$, we find:

$$\frac{n(t)}{n_{TH}} = \frac{I}{I_{TH}} (1 - e^{-t/\tau})$$

where $n_{TH} = aI_{TH}\tau$ = threshold electron density for lasing.

The delay time $t_d$ necessary for $n(t)$ to equal $n_{TH}$ is then given by:

$$t_d = \tau \ln \frac{I}{I - I_{TH}}$$

Figure 5:
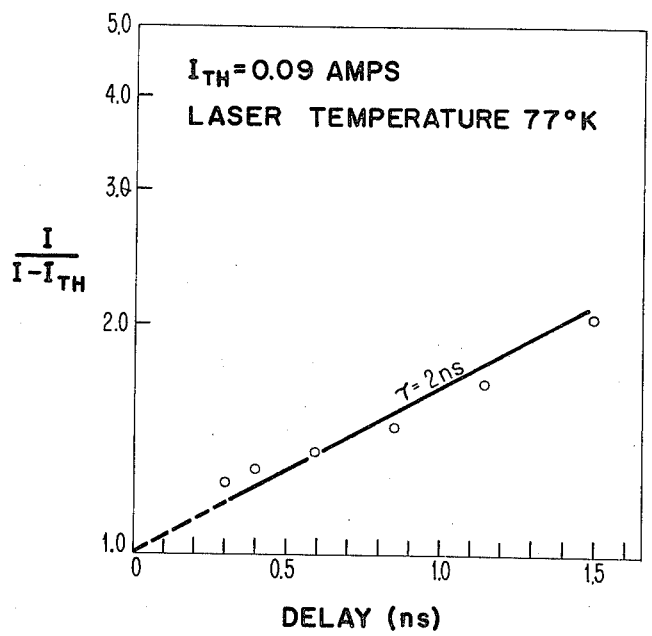
FIG. 5 is a semi-logarithmic graph of $$\frac{I}{I-I_{\text{TH}}} \text{ vs. Delay}$$

FIG. 5 shows a plot of $$t_d \text{ vs. } \ln \frac{I}{I - I_{TH}}$$

From this graph $\tau$ is found to be 2 nanoseconds which agrees substantially with the results of known previous theoretical calculations. (W.P. Dumke, Physics Review 132, 1998 (1963).)

While emphasis has been placed on the utilization of the apparatus disclosed herein in the space environment, it should be appreciated that there are many equally important applications in the terrestrial environment. Measurement of small distances while providing digital outputs which in turn can be applied to computers for machine control or assembly is one possible application. Precise registration of parts because of the high resolution capabilities of the ranging apparatus is another application. Short range communications and ranging where atmospheric conditions are not a deterrent are also feasible. The application to light guides for long distance communication is, of course, entirely possible using the apparatus described herein. Finally, because of the extremely narrow pulse width available, accurate calibration of optical devices is possible to a degree not possible heretofore.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pulse communication and ranging system comprising,
   means for generating a pulse train each of the pulses thereof being of given width and amplitude,
   means for applying information in the form of an amplitude variation of at least one of said pulses of said pulse train,
   a laser device coupled to said information applying means to produce at least a coherent light pulse the width of which is governed by the amplitude variation of said at least one of said pulses of said pulse train, and
   means responsive to the width of said at least a light pulse for recovering said initially applied information.

2. A pulse communication and ranging system comprising,
   a semiconductor laser,
   means for applying a train of varying amplitude pulses to said laser the instantaneous amplitude of said pulses being representative of information to provide a train of coherent light pulses the widths of which vary with the amplitude of the applied pulses, and
   means responsive to the variations in width of said light pulses for recovering the initially applied information.

3. A pulse communication and ranging system according to claim 2 wherein said semiconductor laser is a gallium arsenide injection laser.

4. A pulse communication and ranging system according to claim 2 wherein said semiconductor laser is an indium antimonide injection laser.

5. A pulse communication and ranging system according to claim 2 wherein said semiconductor laser is an indium arsenide injection laser.

6. A pulse communication and ranging system according to claim 2 wherein said semiconductor laser is a gallium arsenide phosphide injection laser.

7. A pulse communication and ranging system according to claim 2 wherein said means for applying a train of varying amplitude pulses includes means for varying the amplitude of said pulse train such that light pulses of variable duration less than said given duration are emitted from said laser.

8. A pulse communication and ranging system according to claim 7 further including means for collimating said light pulses into a narrow beam disposed in close spaced relationship with said semiconductor laser.

9. A pulse communication and ranging system according to claim 8 further including means for detecting said light pulses disposed locally with and remotely from said semiconductor laser.

10. A pulse communication and ranging system according to claim 9 wherein said means for detecting light pulses disposed locally with said semiconductor laser includes a photodiode adapted to receive reflections of said light pulses and having a response time of less than 0.2 nanosecond.

11. A pulse communication and ranging system according to claim 9 wherein said means for detecting light pulses disposed remotely from said semiconductor laser includes a photodiode adapted to receive direct transmissions of said light pulses and having a response time of less than 0.2 nanosecond.

12. A pulse communication and ranging system according to claim 9 further including utilization means coupled to said locally and remotely disposed means for detecting light pulses.

13. A pulse communication and ranging system according to claim 2 further including temperature control means for said semiconductor laser adapted to maintain said semiconductor laser at a fixed temperature anywhere in the range from near absolute zero to above room temperature.

14. A pulse communication and ranging system according to claim 13 further including means for simultaneously varying the amplitude of said pulse train from said applying means and the temperature of said semiconductor laser coupled between said applying means and said temperature control means to increase the amplitude of the generated pulse train with increasing temperature.

15. A light modulation system comprising a source of coherent light, means for applying a pulse train to said source, means for amplitude modulating said pulse train to produce at said source a train of pulses the width of each of which varies in proportion to the instantaneous amplitude of the modulation, and
   means responsive to the variation in width of the pulses of said pulse train optically coupled to said source for recovering said modulation.

16. A light modulation system comprising a source of coherent light, means for applying a pulse train to soaid source, each of said pulses in said train having a pulse width not exceeding 1000 nanoseconds, means for applying information to said train by varying the instantaneous current applied to said source over a range of 1 to 30 amperes in a temperature range of 77° K. to 60° F. to produce a train of light pulses the widths of which vary over a range of 0.1 nanosecond to 500 nanoseconds, and means responsive to the variation in width of said light pulses to recover the initially applied information.

References Cited

UNITED STATES PATENTS

| | | | |
|---|---|---|---|
| 3,053,134 | 9/1962 | Bjornson | 250—199 |
| 3,059,117 | 10/1962 | Boyle et al. | 250—199 |
| 3,176,247 | 3/1965 | Fajans | 250—199 |
| 3,202,934 | 8/1965 | Coffee | 250—199 |

OTHER REFERENCES

Engeler et al., Jour. Appl. Phys., vol. 34, No. 9, September 1963, pp. 2746–2750.

Johnson, Electronics, Dec. 13, 1963, pp. 34–39.

Kibler, Proc. I.R.E. vol. 50, No. 8, August 1962, pp. 1834–35.

Kroeger, Sperry Eng. Review, Winter 1962, pp. 44–53.

Rediker et al., Electronics, vol. 35, No. 10, Oct. 5, 1962, pp. 44 and 45.

Weiser et al., Appl. Phys. Let. vol. 2, No. 9, May 1, 1963, pp. 178, 179.

Electronics, Nov. 16, 1962, pp. 24 and 25.

Konnerth and Lanza, Appl. Phys. Ltrs., vol. 4, No. 7, April 1, 1964, pp. 120 and 121.

ROBERT L. GRIFFIN, Primary Examiner

B. V. SAFOUREK, Assistant Examiner

U.S. Cl. X.R.

332—7.51